Patented Mar. 18, 1924.

1,487,449

UNITED STATES PATENT OFFICE.

CLARENCE FORD EDDY, OF WAVERLY, MASSACHUSETTS, ASSIGNOR TO COCOA PRODUCTS COMPANY OF AMERICA INCORPORATED, A CORPORATION OF DELAWARE.

EXTRACTION OF FATS AND OILS.

No Drawing.  Application filed October 8, 1921.  Serial No. 506,352.

*To all whom it may concern:*

Be it known that I, CLARENCE F. EDDY, a citizen of the United States, residing at Waverly, in the county of Middlesex, State of Massachusetts, have invented certain new and useful Improvements in the Extraction of Fats and Oils; and I do hereby declare the following to be a full, clear, and exact description of the invention, such as will enable others skilled in the art to which it appertains to make and use the same.

This invention relates to the extraction of fats, oils and the like from finely divided solid materials and has particular application to the removal of cocoa butter from cocoa powder, though obviously the invention is not restricted to such use.

The extraction of fats, oils and the like from finely divided solid materials is a matter of considerable commercial importance. There are various materials of this class from which valuable oils and fats may be recovered by a sufficiently simple and inexpensive method. The problem is one of some difficulty, however, because while it is relatively easy to accomplish the extraction of the fat or oil with a suitable solvent, the separation of the solvent with the fat or oil from the solid material presents practical difficulties. Ordinarily the finely divided solid material will not settle rapidly in the solvent. Resort must be had, therefore, to filtration, and if a dense filter medium is used, it is rapidly clogged by the finely divided materials and filtration ceases. On the other hand, if a looser filter medium is employed, a considerable proportion of the solid material passes therethrough. These difficulties are particularly met in the attempt to extract cocoa butter from cocoa powder. The cocoa powder is normally in an extreme state of subdivision which renders impracticable any attempt at filtration. Inasmuch as cocoa butter is a valuable food product, its extraction in an edible condition is desirable and the solvents available for its separation are therefore more or less limited. None of the available solvents permit rapid settling of the cocoa powder, and it has been heretofore impossible, therefore, to accomplish extraction of cocoa butter from cocoa powder by means of solvents in an economical and efficient manner.

It is the object of the present invention to provide an effective method for accomplishing the extraction of fats, oils and the like from finely divided solid materials and the separation of the solvent containing the fat or oil from the solid material.

Further objects and advantages of the invention will be apparent as it is better understood by reference to the following specification in which the preferred embodiment of the invention is described.

It has been discovered that the separation of a solvent containing extracted fatty material from finely divided solids may be readily accomplished by the addition of a precipitating agent. This precipitating agent should be of such a character as to tend to coagulate and increase the apparent volume of the solids, displacing at the same time the solvent and absorbed fatty material. As a result of the use of the precipitating agent the solids separate and settle rapidly and the bulk of the solvent may be removed therefrom by decantation. Preferably, however, the separation is accomplished by one of the usual types of filters employed in commercial operations such as a filter press or rotary drum filter. The filter may be provided with ordinary filter cloth, the precipitate being held on the filter cloth without clogging and without permitting the passage of any material part thereof through the cloth. The preferred precipitating agent is water or water containing a small amount of certain salts such as sodium chloride or alum. The water is added in considerable volume after the extraction has been accomplished and has the immediate effect of changing the character of the solid so that it separates rapidly from the solution. The addition of the water also has the great advantage of displacing most of the absorbed fat and solvent from the solid matter. As a result, it is possible by continuous countercurrent decantation to secure a solution containing the major portion of the fat or oil, leaving the solid material practically free therefrom, or the separation may be accomplished by means of a filter. The cake may be washed first with fat-free solvent and finally with the water to displace the solvent. More than 90% of the fat is thus recovered in a single extraction. Any solvent remaining in the cake may be separated by steam distillation or other appropriate means.

In carrying out the method as specifically applied to the separation of cocoa butter from cocoa powder, the powder is first mixed with from two to four times its weight of the solvent which may be benzol, for example. The mass is agitated for a period of from five to ten minutes or until the extraction is substantially complete. The time required will necessarily vary in accordance with the character of the material treated, and the extraction may be accomplished in a relatively shorter time if carried on under a slightly elevated temperature, not high enough, however, to vaporize the solvent. When extraction has been satisfactorily accomplished, water is added slowly, with vigorous stirring, to the extent of from thirty to one hundred fifty per cent of the weight of the solid material. The amount would vary, depending upon the absorbing capacity of the solid material. Thus very finely divided cocoa powder will require from eighty to one hundred per cent of its weight of water to insure the best separation, while coarser or denser material such as cocoa powder containing a proportion of shells will require only forty to sixty per cent of its weight of water. At no time is more water added than will be absorbed by the solid matter without the formation of a separate water phase. During the addition of the water, the mass is agitated to insure thorough contact thereof with the solid material so that the latter may absorb sufficient water to accomplish the desired result. After the water has been added, agitation is stopped and the solids are permitted to settle or are removed by the filtering operation. The solids are then washed with a quantity of benzol to remove any remaining fat and then with water to displace the benzol. Any water which comes over with the benzol solution of fat readily settles to the bottom of the receiver and can be drawn off separately.

The solvent may be separated from the recovered fat or oil by distillation and condensation in accordance with recognized practice. The solvent is thus available for re-use in the further application of the method. Countercurrent steam distillation of the fat in a tower still is desirable in order to remove the last traces of solvent.

The method as hereinbefore described satisfactorily overcomes a difficulty which has previously prevented extraction of fats and oils from finely divided solid materials, and particularly the recovery of cocoa butter from cocoa powder. Large quantities of cocoa powder are available and the economical recovery of cocoa butter therefrom in an edible condition affords a valuable food product in corresponding quantity. The details of mechanical operations hereinbefore set forth are of a simple character corresponding to similar operations widely employed in handling materials of the kind described. Consequently, no peculiar or special apparatus is required and the method is adapted for large scale operations without skilled attendants.

Various changes may obviously be made in the details of operation that may be necessary to adapt the method to the treatment of different materials within the scope of the appended claims and without departing from the invention or sacrificing any of its advantages.

I claim:

1. The method of extracting fats, oils and the like from finely divided solid material, which comprises suspending the material in a solvent for the fat or oil until extraction is accomplished and thereafter adding an aqueous precipitating agent to the mixture of solid material and solvent in quantity sufficient only to be absorbed by the solid material whereby the extracted solid material settles readily in the solvent without the formation of a separate liquid phase.

2. The method of extracting fats, oils and the like from finely divided solid material, which comprises suspending the material in a solvent for the fat or oil until extraction is accomplished and thereafter adding sufficient water only to the mixture of solid material and solvent to cause the extracted solid material to settle rapidly in the solvent without forming a separate water phase.

3. The method of extracting fats, oils and the like from finely divided solid material, which comprises suspending the material in a solvent for the fat or oil until extraction is accomplished, thereafter adding an aqueous agent having a selective affinity for the solid material to the mixture of solid material and solvent in quantity sufficient only to be absorbed by the solid material whereby the solvent and fat is displaced from the extracted solid material, and separating the solvent from the extracted solid material without forming a separate liquid phase.

4. The method of extracting fats, oils and the like from finely divided solid material, which comprises suspending the material in a solvent until extraction is accomplished and thereafter agitating the mixture of solid material and solvent with sufficient water only to cause the extracted solid material to separate readily from the solution without forming a separate water phase.

5. The method of extracting fats, oils and the like from finely divided solid material, which comprises agitating the material with a solvent until extraction is accomplished, thereafter adding an aqueous precipitating agent having a selective affinity for the solid material to the mixture of solid material and solvent in quantity sufficient only to be absorbed by the solid material and separating the extracted solid material from the solvent without forming a separate liquid phase.

6. The method of extracting fats, oils and the like from finely divided solid material, which comprises agitating the material with a solvent until extraction is accomplished, thereafter adding water to the mixture of solid material and solvent in proportion to be absorbed by the solid material without the formation of a separate liquid phase and separating the extracted solid material from the solvent.

7. The method of extracting fats, oils and the like from finely divided solid material, which comprises subjecting the material to the action of a solvent, adding sufficient water to cause the solid matter to separate readily from the solution, filtering the mass, and washing the solid first with the solvent and then with water to displace the solvent.

8. The method of recovering fat from cocoa powder, which comprises treating the cocoa powder with benzol to dissolve the fat and adding water to the mass in quantity sufficient to displace the dissolved fat from the cocoa powder and to permit the separation of the cocoa powder from the solution.

9. The method of recovering fat from cocoa powder, which comprises agitating the cocoa powder with a solvent to dissolve the fat and adding water to the mass in quantity sufficient to displace the dissolved fat from the cocoa powder and to permit the ready filtration of the cocoa powder from the solution.

10. The method of recovering fat from cocoa powder, which comprises agitating the cocoa powder with a solvent to dissolve the fat and adding water to the mass in quantity sufficient to displace the dissolved fat from the cocoa powder and to permit the ready filtration of the cocoa powder from the solution, filtering the mass and washing the solid material first with the solvent and then with water.

In testimony whereof I affix my signature.

CLARENCE FORD EDDY.